United States Patent
Kurita

(10) Patent No.: US 9,437,878 B2
(45) Date of Patent: Sep. 6, 2016

(54) ELECTRICITY STORAGE MODULE

(71) Applicant: HONDA MOTOR CO., LTD., Tokyo (JP)

(72) Inventor: Tomomi Kurita, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 460 days.

(21) Appl. No.: 13/869,026

(22) Filed: Apr. 24, 2013

(65) Prior Publication Data

US 2013/0323552 A1    Dec. 5, 2013

(30) Foreign Application Priority Data

May 31, 2012   (JP) .................................. 2012/124847

(51) Int. Cl.
| | |
|---|---|
| H01M 10/04 | (2006.01) |
| H01M 6/50 | (2006.01) |
| H01M 2/10 | (2006.01) |
| H01M 10/48 | (2006.01) |

(52) U.S. Cl.
CPC ......... *H01M 6/5038* (2013.01); *H01M 2/1077* (2013.01); *H01M 10/482* (2013.01); *H01M 10/486* (2013.01); *H01M 2220/20* (2013.01)

(58) Field of Classification Search
CPC ........... H01M 10/482; H01M 10/486; H01M 2/1077

USPC ......................................................... 429/90
See application file for complete search history.

(56) References Cited

FOREIGN PATENT DOCUMENTS

| | | |
|---|---|---|
| JP | 2010-287550 | 12/2010 |
| JP | 2012064358 | * 3/2012 |

OTHER PUBLICATIONS

JP 2012064358—Translation.*

* cited by examiner

*Primary Examiner* — Ladan Mohaddes
(74) *Attorney, Agent, or Firm* — Mori & Ward, LLP

(57) ABSTRACT

An electricity storage module includes a plurality of electricity storage cells and a plurality of electricity storage cell holders. Each of the plurality of electricity storage cell holders includes a thermistor holding portion. At least one of the thermistor holding portions of the plurality of electricity storage cell holders is provided to support a thermistor. The thermistor holding portion includes a spring member contact portion, a first engaging portion, and a second engaging portion. The first engaging portion of one of adjacent thermistor holding portions engages with the second engaging portion of another of the adjacent thermistor holding portions to prevent a spring member contact portion from being deformed away from one of the electricity storage cells.

8 Claims, 13 Drawing Sheets

ELECTRICITY STORAGE MODULE

CROSS-REFERENCE TO RELATED APPLICATIONS

The present application claims priority under 35 U.S.C. §119 to Japanese Patent Application No. 2012-124847, filed May 31, 2012, entitled "Electricity Storage Module." The contents of this application are incorporated herein by reference in their entirety.

BACKGROUND OF THE INVENTION

1. Field of the Invention

The present disclosure relates to an electricity storage module.

2. Discussion of the Background

If the temperature of electricity storage cells forming an electricity storage module rises excessively, deterioration is caused. So, it is necessary to suppress the temperature rise to prevent the deterioration of the electricity storage cells by detecting the temperature of the electricity storage cells with a thermistor and, if the temperature rises excessively, limiting the current of charge and discharge or aggressively performing cooling.

Japanese Unexamined Patent Application Publication No. 2010-287550 describes attaching a thermistor to a separator (electricity storage cell holder) interposed between adjacent electricity storage cells, bringing the thermistor into contact with the electricity storage cells, and detecting the temperature.

SUMMARY OF THE INVENTION

According to one aspect of the present invention, an electricity storage module includes a plurality of electricity storage cells and a plurality of electricity storage cell holders. The plurality of electricity storage cells and the plurality of electricity storage cell holders are stacked alternately in a stacking direction. Each of the plurality of electricity storage cell holders includes a thermistor holding portion. At least one of the thermistor holding portions of the plurality of electricity storage cell holders is provided to support a thermistor. The thermistor has a temperature measuring portion and a spring member. The thermistor holding portion includes a spring member contact portion, a first engaging portion, and a second engaging portion. The spring member is to be in contact with the spring member contact portion. The temperature measuring portion is pressed against one of the electricity storage cells by a spring force of the spring member when the spring member is in contact with the spring member contact portion. The first engaging portion of one of adjacent thermistor holding portions engages with the second engaging portion of another of the adjacent thermistor holding portions to prevent the spring member contact portion from being deformed away from one of the electricity storage cells.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
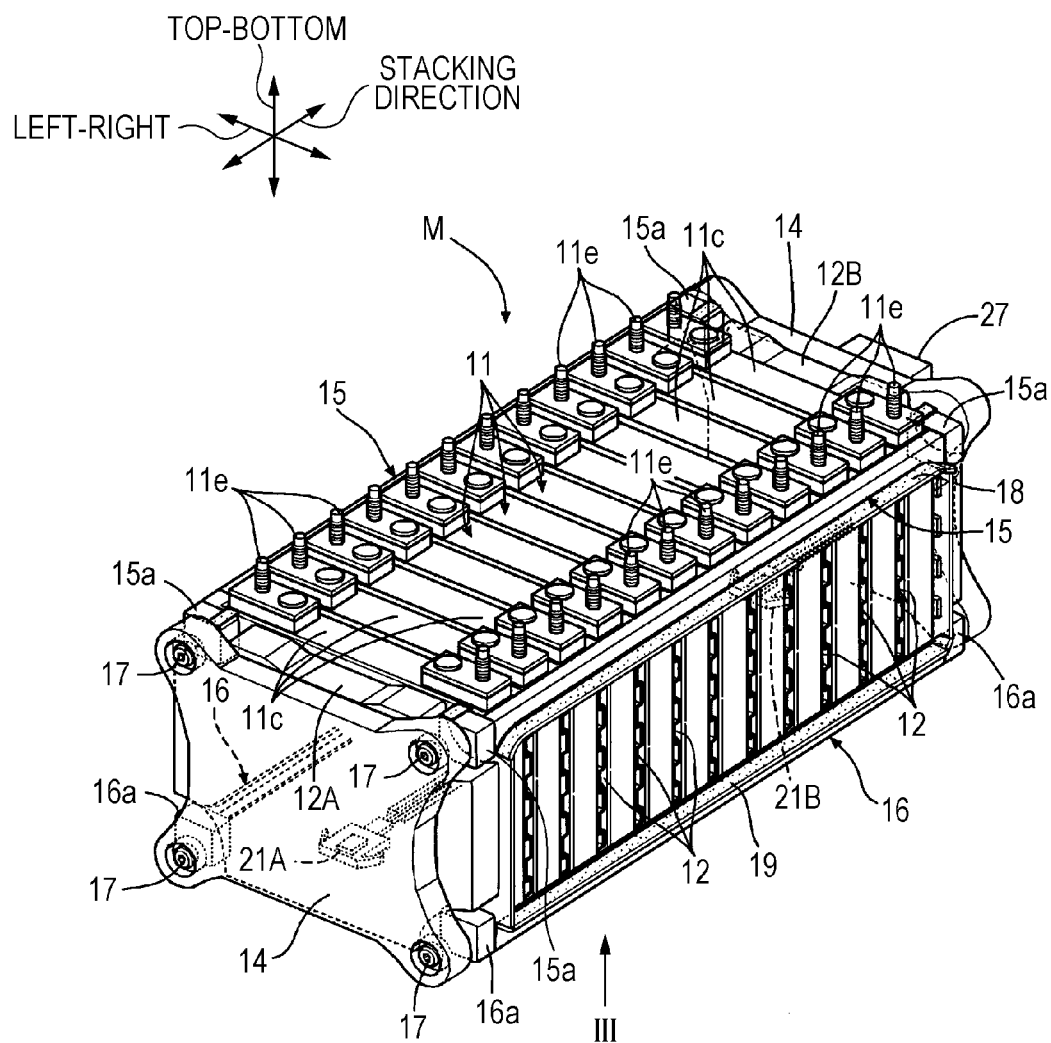
FIG. 1 is a perspective view of an electricity storage module (first embodiment).

The embodiments will now be described with reference to the accompanying drawings, wherein like reference numerals designate corresponding or identical elements throughout the various drawings.

First Embodiment

A first embodiment of the present disclosure will be described below with reference to FIG. 1 to FIG. 12.

Figure 2:
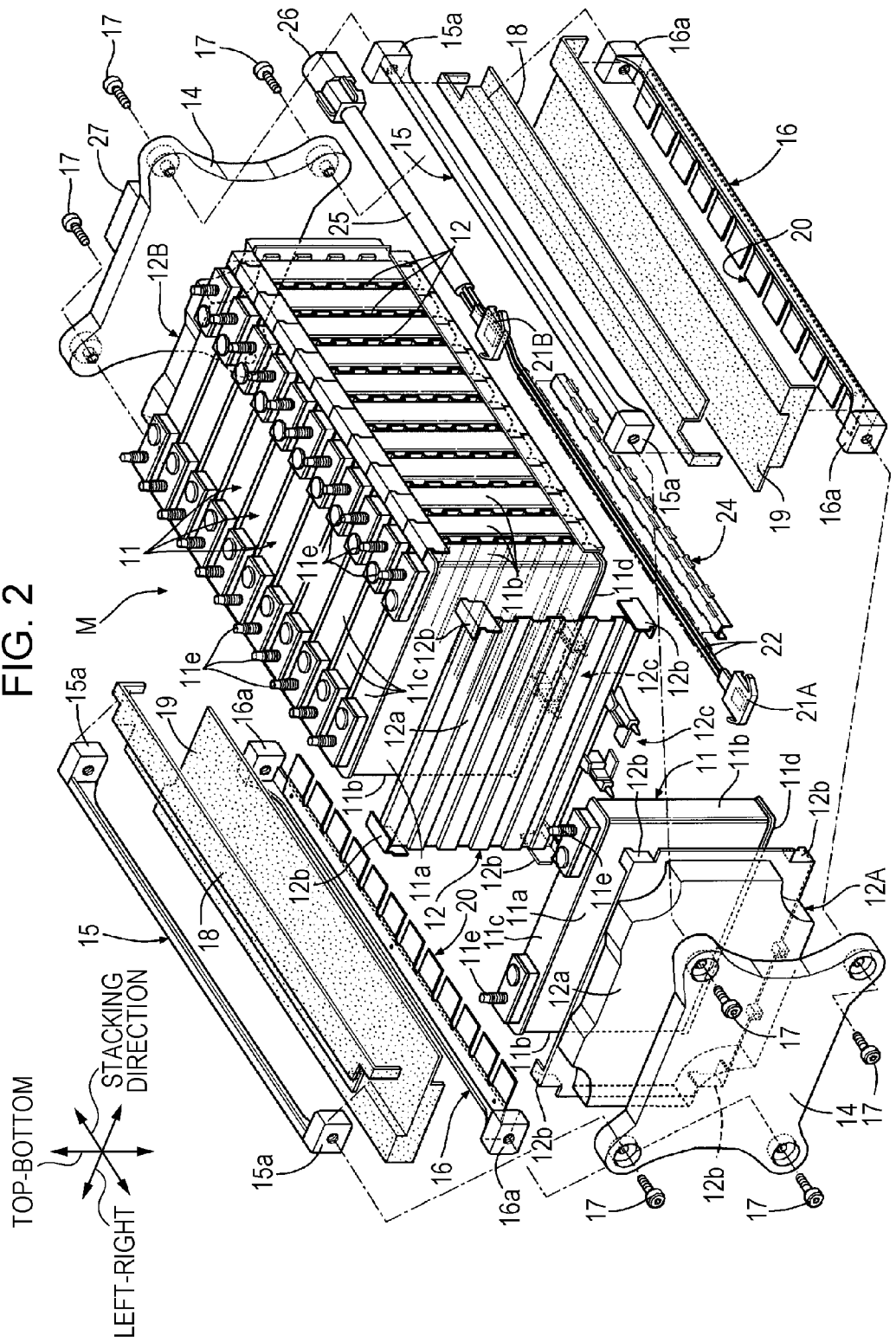
FIG. 2 is an exploded perspective view of the electricity storage module (first embodiment).

As shown in FIG. 1 and FIG. 2, an electricity storage module M used as a power supply device for an electric vehicle or a hybrid vehicle has a predetermined number of (twelve in the embodiment) electricity storage cells 11 stacked in a stacking direction. Each electricity storage cell 11, which is, for example, a lithium-ion battery, is formed in a rectangular parallelepiped shape, and has a pair of major surfaces 11a that face each other, a pair of side surfaces 11b that are perpendicular to the major surfaces 11a and that face each other, and a top surface 11c and a bottom surface 11d that are perpendicular to the major surfaces 11a and the side surfaces 11b and that face each other. The top surface 11c is provided with positive and negative electrodes 11e.

In this specification, a direction that is perpendicular to the stacking direction and that connects the top surface 11c and the bottom surface 11d of the electricity storage cell 11 will be referred to as top-bottom direction, and a direction that is perpendicular to the stacking direction and that connects the pair of side surfaces 11b of the electricity storage cell 11 will be referred to as left-right direction.

The major surfaces 11a of the twelve electricity storage cells 11 and eleven square plate-like intermediate electricity storage cell holders 12 formed of synthetic resin are stacked alternately in the stacking direction. On the outer side in the stacking direction of two electricity storage cells 11 at both ends in the stacking direction, a pair of square plate-like end electricity storage cell holders 12A and 12B formed of synthetic resin are placed. On the outer side in the stacking direction of the pair of end electricity storage cell holders 12A and 12B, a pair of metal end plates 14 are placed. The eleven intermediate electricity storage cell holders 12 are members that are interchangeable and that have the same shape. The pair of end electricity storage cell holders 12A and 12B are members that differ in shape from the intermediate electricity storage cell holders 12 and that differ in shape from each other.

The electricity storage module M is assembled by connecting the four corners of one of the end plates 14 with the four corners of the other end plate 14 with upper frames 15 that are a pair of metal rod-like members having an L-shaped cross-section and lower frames 16 that are a pair of metal rod-like members having an L-shaped cross-section, with the electricity storage cells 11, the intermediate electricity storage cell holders 12, the end electricity storage cell holders 12A and 12B, and the end plates 14 stacked in the stacking direction. That is, the electricity storage module M is assembled by pressing thick fastening portions 15a provided at both ends of the upper frames 15 and thick fastening portions 16a provided at both ends of the lower frames 16 against the four corners of the end plates 14, and screwing bolts 17 through the end plates 14 into the fastening portions 15a and 16a.

At this time, upper insulators 18 made of synthetic resin for preventing liquid junction between the electricity storage cells 11 and the upper frames 15 due to dew condensation water are placed between the stack of the electricity storage cells 11, the intermediate electricity storage cell holders 12, and the end electricity storage cell holders 12A and 12B, and the upper frames 15. Similarly, lower insulators 19 made of synthetic resin for preventing liquid junction between the electricity storage cells 11 and the lower frames 16 due to dew condensation water are placed between the stack of the electricity storage cells 11, the intermediate electricity storage cell holders 12, and the end electricity storage cell holders 12A and 12B, and the lower frames 16. In addition, leaf springs 20 for pushing up the bottom surfaces 11d of the electricity storage cells 11 to prevent occurrence of backlash are placed between the lower frames 16 and the lower insulators 19.

Each of the intermediate electricity storage cell holders 12 and the end electricity storage cell holders 12A and 12B has a plate-like plate portion 12a, four third engaging portions 12b protruding from the four corners of the plate portion 12a in the stacking direction, and a thermistor holding portion 12c provided at the center of the lower end of the plate portion 12a.

Next, the structure of the thermistor holding portion 12c will be described in detail with reference to FIG. 3 to FIG. 9.

The thermistor holding portion 12c protruding downwardly and in the stacking direction from the center of the lower end of the plate portion 12a of each intermediate electricity storage cell holder 12 has a pair of left and right vertical wall portions 12d extending along the stacking direction and parallel to each other, and a pair of left and right horizontal wall portions 12e (spring member contact portion) extending from the lower ends of the vertical wall portions 12d toward each other. A predetermined gap is formed between the opposed distal ends of the horizontal wall portions 12e. The length in the stacking direction of the horizontal wall portions 12e is less than the length in the stacking direction of the vertical wall portions 12d. Step portions 12f (see FIG. 7) protruding toward each other are formed in middle positions in the stacking direction of the vertical wall portions 12d. A shaft portion 12g extending in the stacking direction is integrally formed on the outer wall surface in the left-right direction of each vertical wall portion 12d. A pin-like first engaging portion 12h is provided at one end in the stacking direction of each shaft portion 12g. A pinhole-like second engaging portion 12i with which the first engaging portion 12h can engage is formed at the other end in the stacking direction of each shaft portion 12g.

The pair of end electricity storage cell holders 12A and 12B both have third engaging portions 12b at the four corners thereof, and a thermistor holding portion 12c at the center of the lower end thereof. The thermistor holding portion 12c of the end electricity storage cell holder 12A only has two pinhole-like second engaging portions 12i (see FIG. 4 to FIG. 6). The end electricity storage cell holder 12B has a thermistor holding portion 12c having the same structure as the thermistor holding portions 12c of the intermediate electricity storage cell holders 12 and having pin-like first engaging portions 12h (see FIG. 8 to FIG. 9).

In a state where the electricity storage module M is assembled, the thermistor holding portions 12c of the eleven intermediate electricity storage cell holders 12 are connected in series in the stacking direction along the bottom surfaces 11d of the electricity storage cells 11, and the bottom surfaces 11d of the electricity storage cells 11 on both sides in the left-right direction of the thermistor holding portions 12c are covered by the left and right lower insulators 19.

Figure 4:
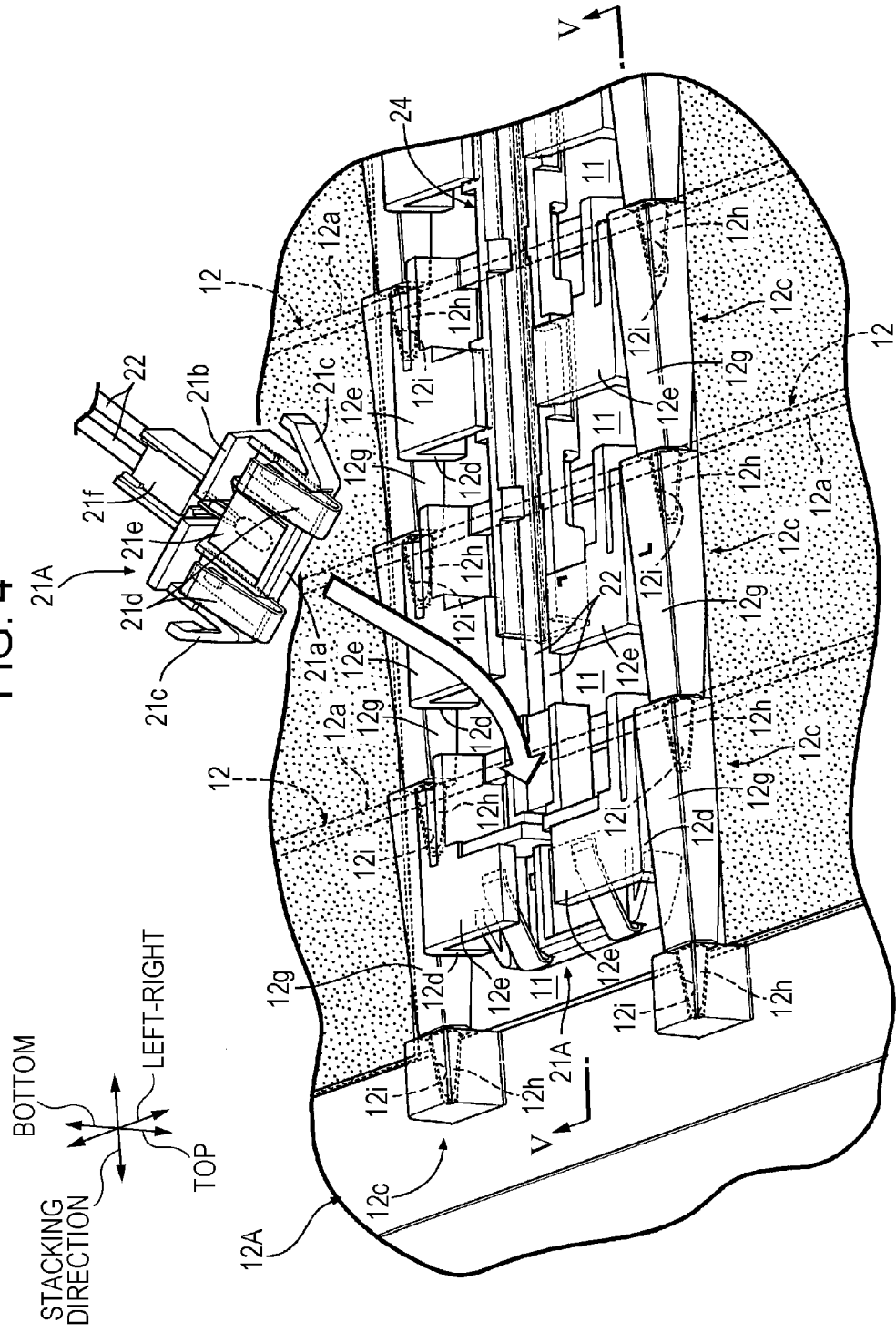
FIG. 4 is a view in the direction of arrow IV of FIG. 3 (first embodiment).
Figure 5:
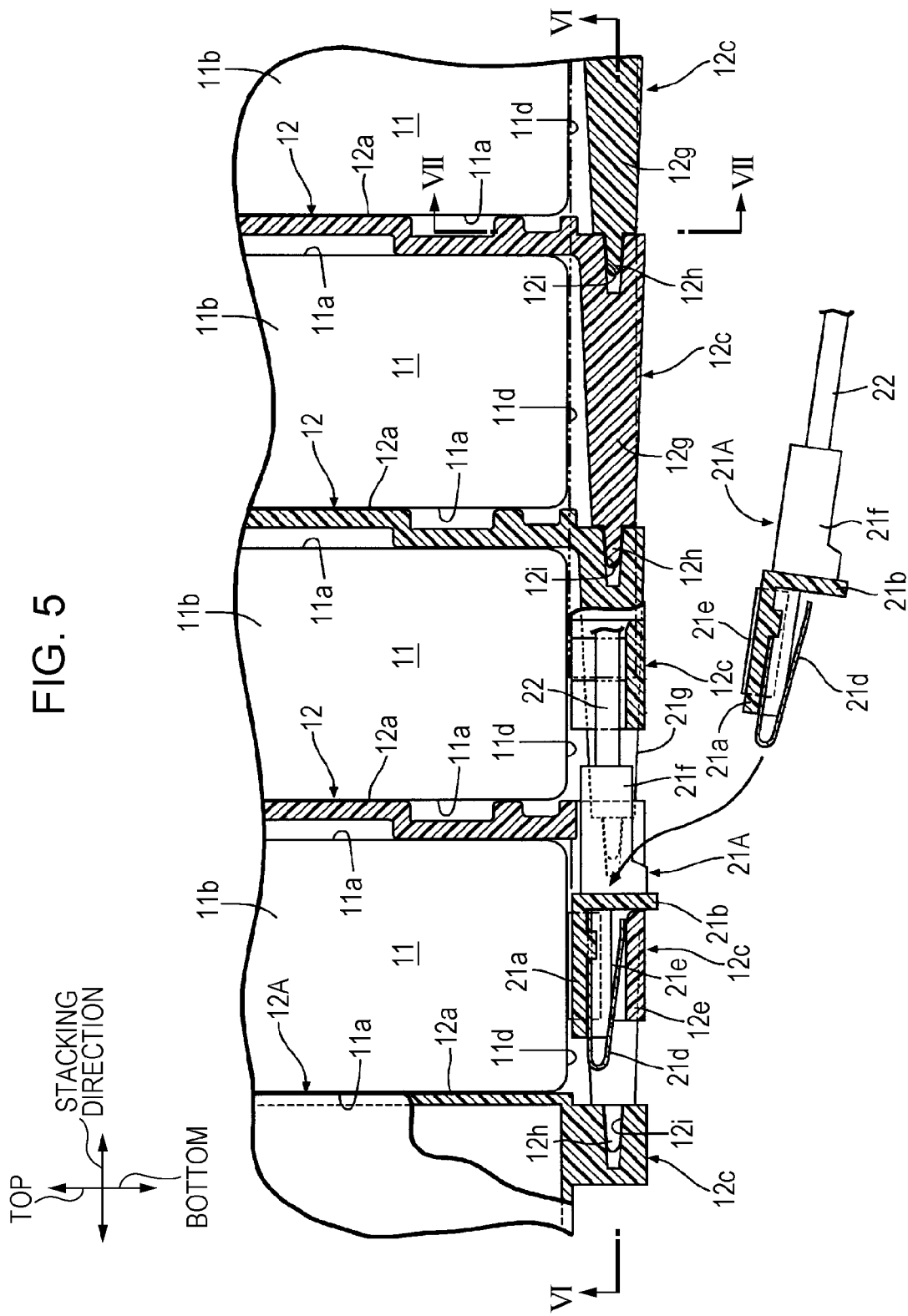
FIG. 5 is a sectional view taken along line V-V of FIG. 4 (first embodiment).
Figure 6:
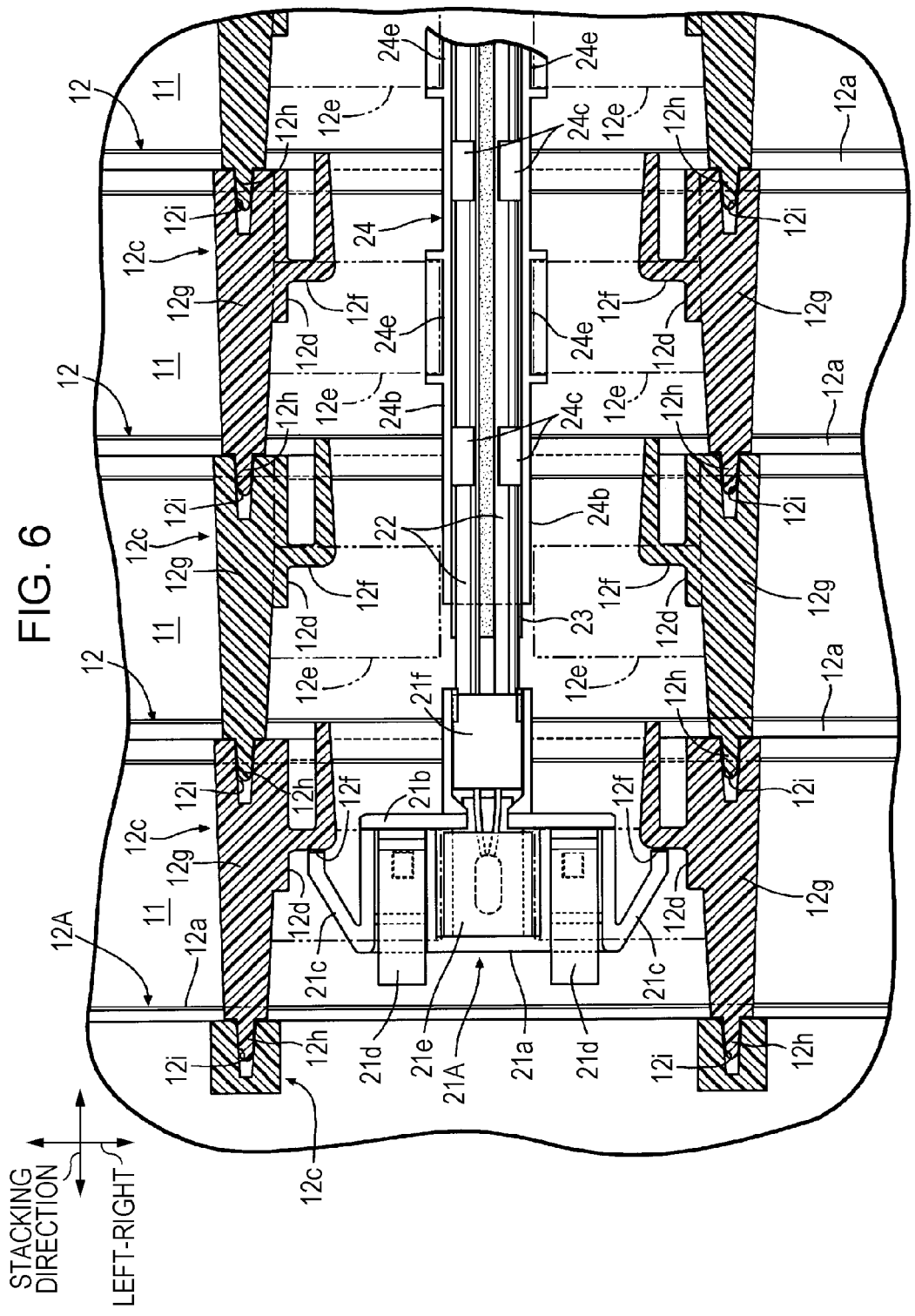
FIG. 6 is a sectional view taken along line VI-VI of FIG. 5 (first embodiment).
Figure 7:
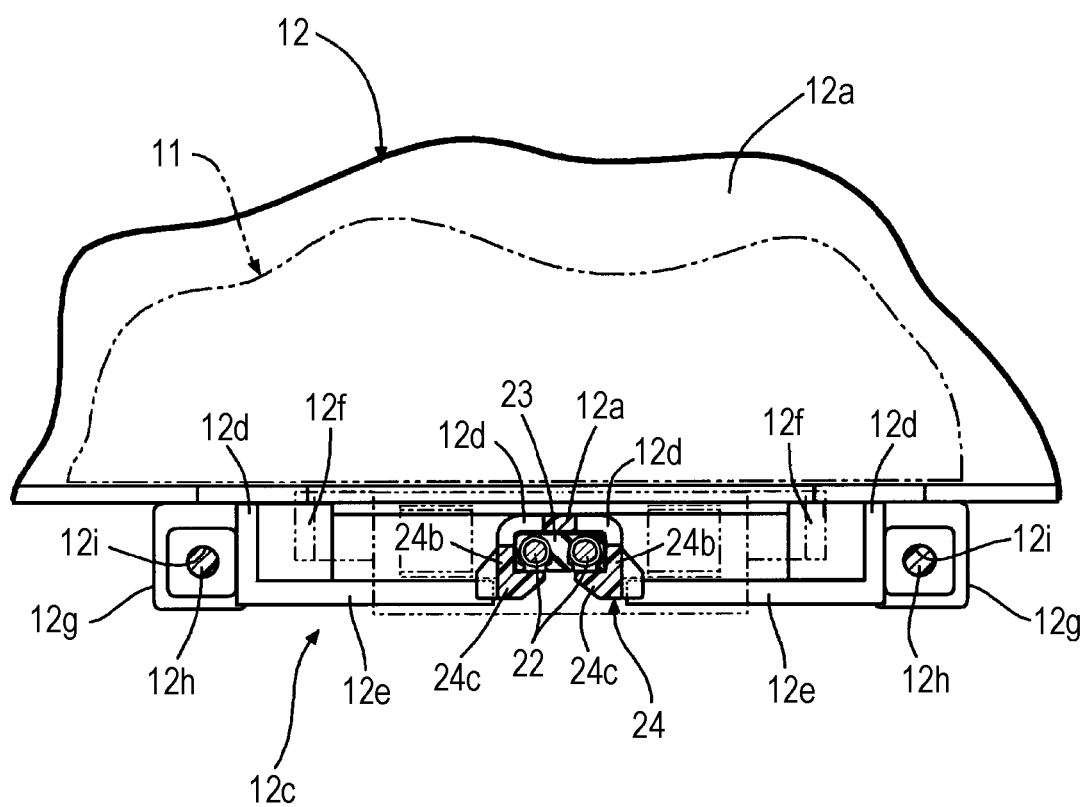
FIG. 7 is a sectional view taken along line VII-VII of FIG. 5 (first embodiment).
Figure 8:
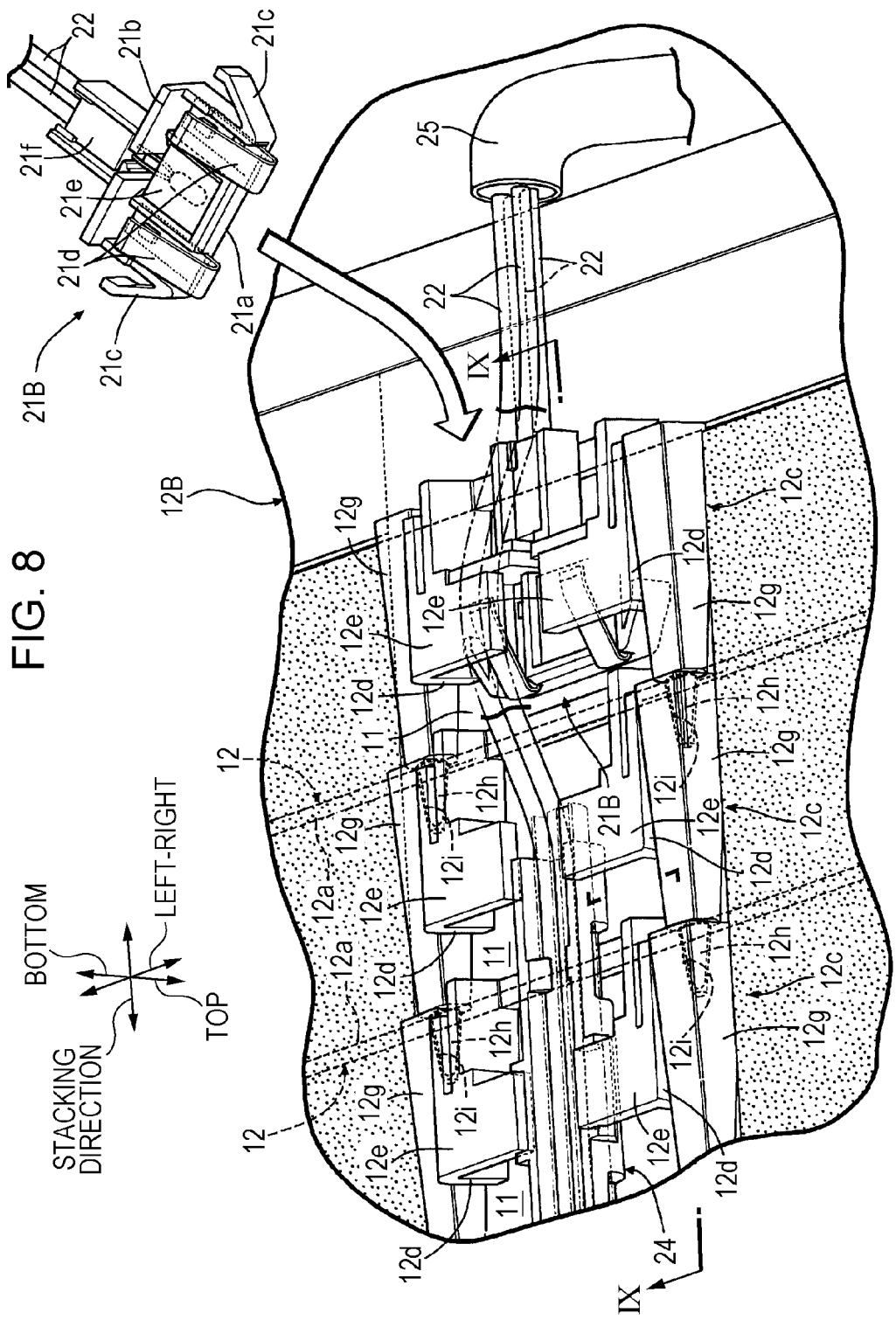
FIG. 8 is a view in the direction of arrow VIII of FIG. 3 (first embodiment).

As shown in FIG. 4 to FIG. 6, the thermistor 21A has a rectangular bottom wall portion 21a, a rear wall portion 21b arising from the rear end in the stacking direction of the bottom wall portion 21a, a pair of left and right engaging claws 21c protruding outwardly in the left-right direction from both the left and right ends of the bottom wall portion 21a, a pair of left and right V-shaped spring members 21d fixed to the bottom wall portion 21a between the pair of engaging claws 21c, a temperature measuring portion 21e fixed to the bottom wall portion 21a between the pair of spring members 21d, and a connector portion 21f provided on the rear surface of the rear wall portion 21b and connecting the temperature measuring portion 21e to two harnesses 22. The structure of the thermistor 21B is the same as the above-described structure of the thermistor 21A.

Figure 12:
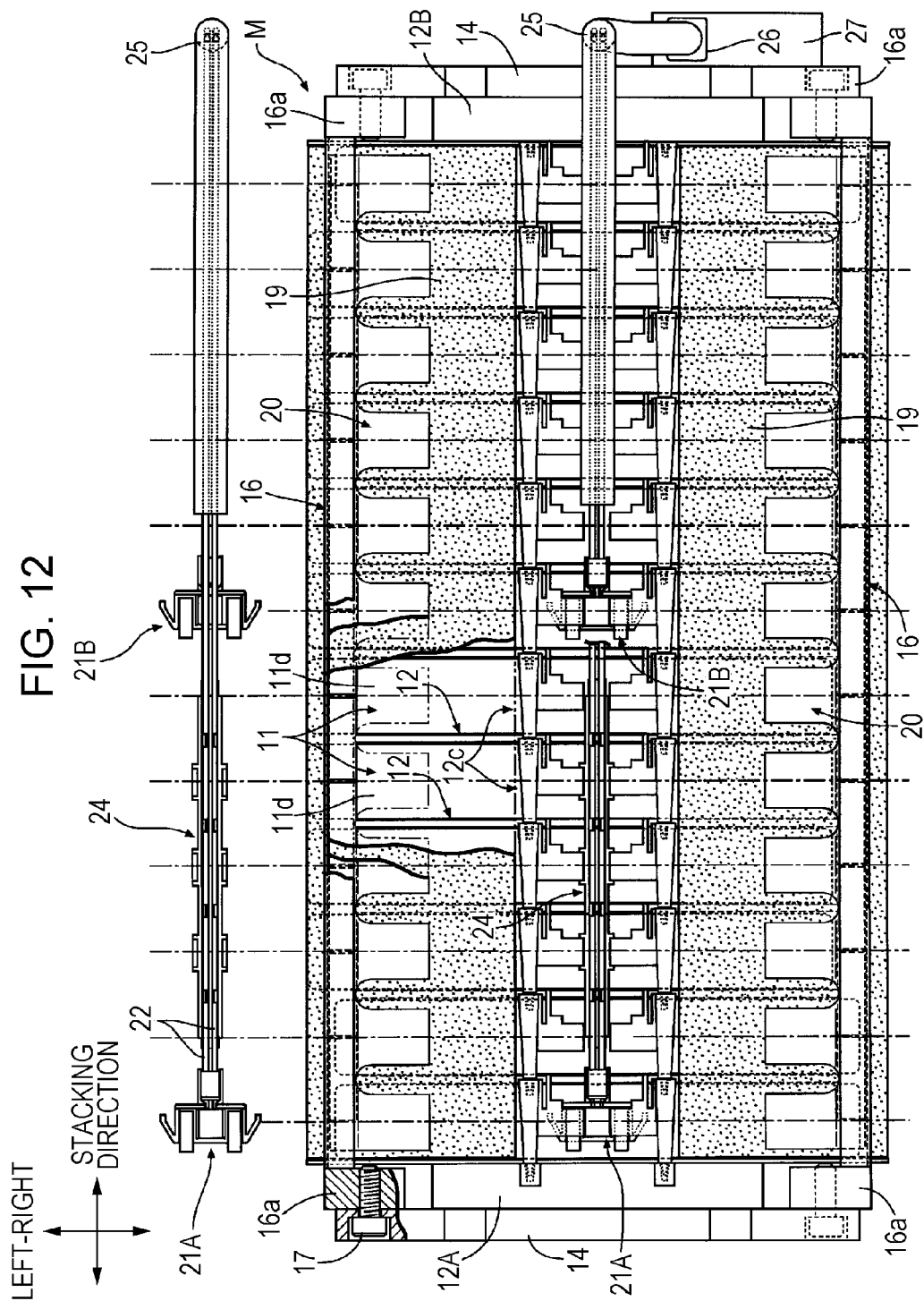
FIG. 12 is a working explanatory view corresponding to FIG. 3 (first embodiment).

In this embodiment, the temperatures of the electricity storage cell 11 adjacent to one of the end plates (first end plate) 14 and the electricity storage cell 11 adjacent to the other end plate (second end plate) 14 are measured by the thermistors 21A and 21B (see FIG. 3), or the temperatures of the electricity storage cell 11 adjacent to the first end plate 14 and the seventh electricity storage cell 11 from the first end plate 14 are measured by the thermistors 21A and 21B (see FIG. 12). The former case will be described below.

Figure 3:
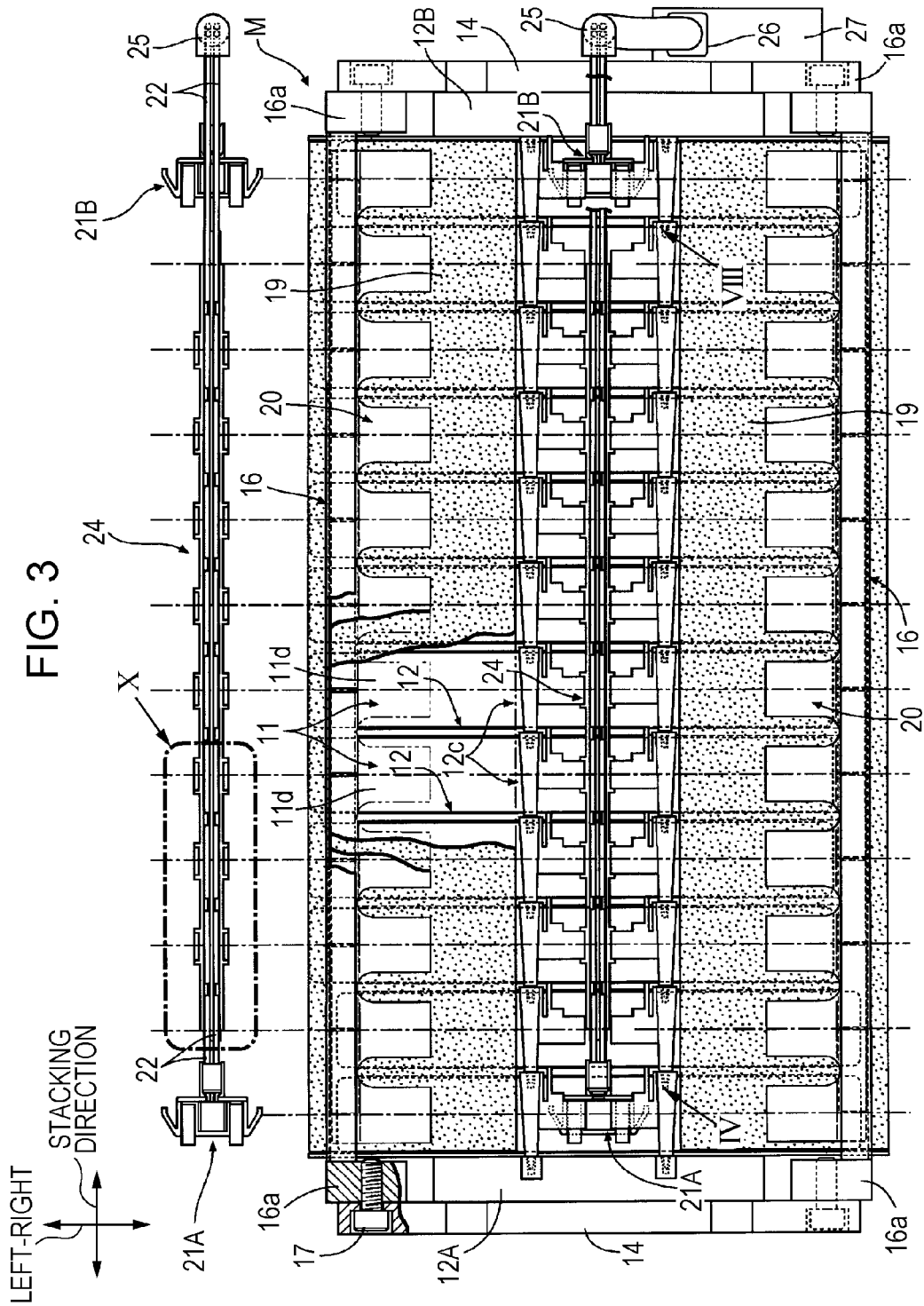
FIG. 3 is a view in the direction of arrow III of FIG. 1 (first embodiment).
Figure 10:
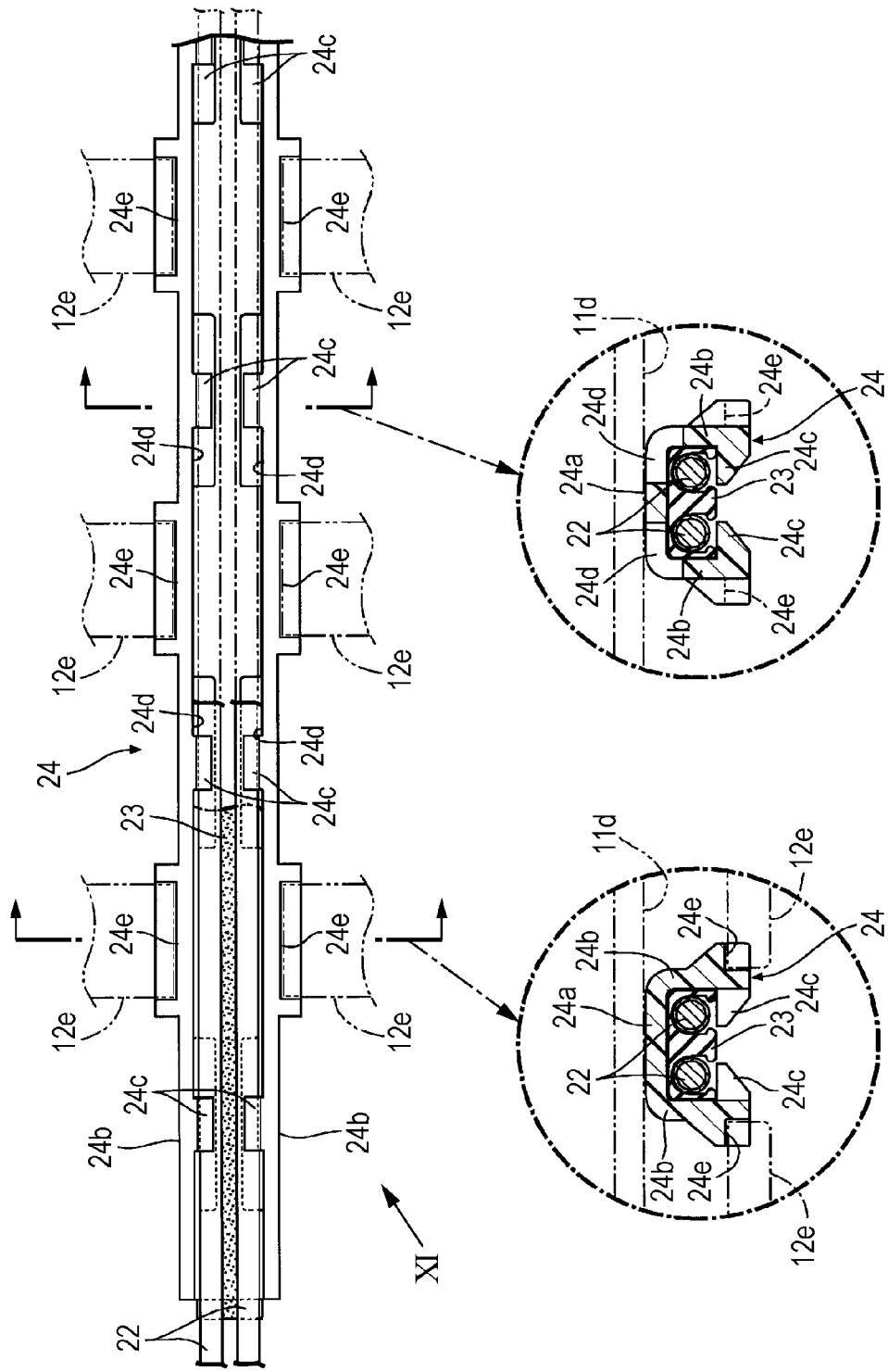
FIG. 10 is an enlarged view of part X of FIG. 3 (first embodiment).
Figure 11:
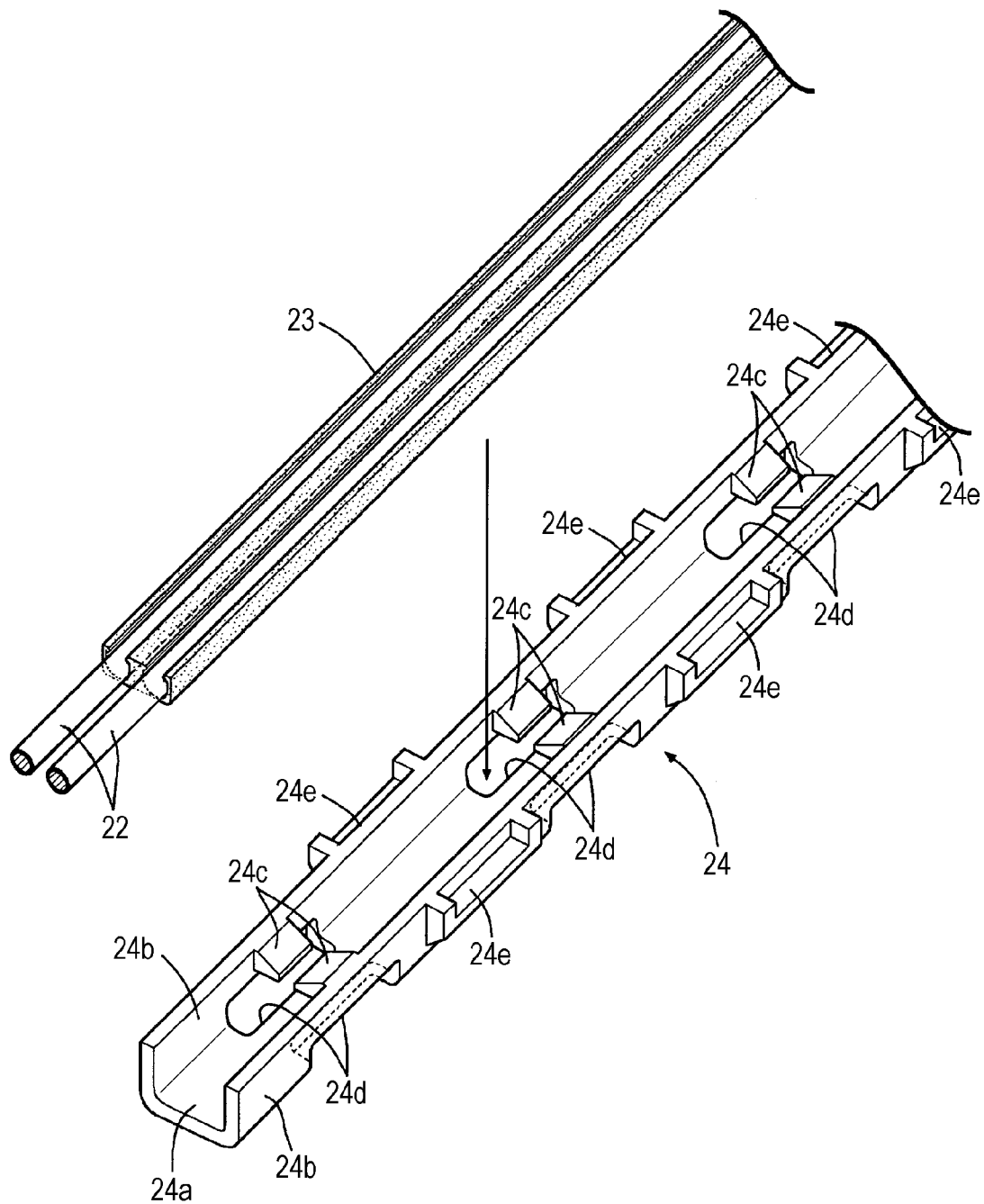
FIG. 11 is a view in the direction of arrow XI of FIG. 10 (first embodiment).

As shown in FIG. 3, FIG. 10, and FIG. 11, the harnesses 22 extending from the thermistor 21A attached to the thermistor holding portion 12c of the intermediate electricity storage cell holder 12 holding the electricity storage cell 11 adjacent to the first end plate 14 are held inside a harness holder 24 formed of synthetic resin in a sheath-like shape. The harness holder 24, which has a U-shaped cross-section, has a bottom wall 24a, and a pair of side walls 24b arising from both the left and right edges of the bottom wall 24a, and is formed so as to open in a direction opposite to the electricity storage cells 11. A plurality of claw portions 24c are protruded from the distal ends of the side walls 24b toward each other. A plurality of drainage holes 24d are formed at positions that are the boundaries between the bottom wall 24a and the side walls 24b and that correspond to the claw portions 24c. Recesses 24e with which the distal ends of the horizontal wall portions 12e of the thermistor holding portions 12c are formed between adjacent claw portions 24c and on the outer surfaces of the side walls 24b.

The pair of harnesses 22 are placed inside an inner holder 23 that is formed of flexible synthetic resin and that has an E-shaped cross-section in order to prevent friction, are inserted into a space surrounded on three sides by the bottom wall 24a and the pair of side walls 24b of the harness holder 24, and are held by the claw portions 24c so as not to come off the harness holder 24. The harnesses 22 of the thermistor 21A extending from the other end in the stacking direction of the harness holder 24 are placed on the thermistor 21B, and a total of four harnesses 22 of the thermistors 21A and 21B are bundled and covered by a harness cover 25. A connector 26 provided at the distal ends of the four harnesses 22 protruding from the harness cover 25 is connected to an electronic control unit 27 provided on the outer surface of the second end plate 14. By engaging the distal ends of the horizontal wall portions 12e of the thermistor holding portions 12c with the recesses 24e of the harness holder 24 holding the harnesses 22 of the thermistor 21A and the inner holder 23, the harness holder 24 is fixed in contact with the bottom surface of the electricity storage module M and along the stacking direction.

When the pair of thermistors 21A and 21B are brought into contact with the electricity storage cells 11 at both ends in the stacking direction, the length of the harness holder 24 corresponds to the length of ten stacked electricity storage cells 11 (see FIG. 3). When the pair of thermistors 21A and 21B are brought into contact with the first and seventh electricity storage cells 11 from one end in the stacking direction, the length of the harness holder 24 corresponds to the length of five stacked electricity storage cells 11 (see FIG. 12).

Next, the working of the embodiment of the present disclosure having the above-described configuration will be described.

To attach the thermistor 21A to the bottom surface of the assembled electricity storage module M, the distal end of the thermistor 21A is inserted between the left and right vertical walls 12d of the thermistor holding portion 12c of the intermediate electricity storage cell holder 12 at one end in the stacking direction, with the temperature measuring portion 21e of the thermistor 21A facing the bottom surfaces 11d of the electricity storage cells 11, and the pair of spring members 21d are thereby brought into contact with the upper surfaces (surfaces facing the bottom surface 11d of the electricity storage cell 11) of the left and right horizontal walls 12e. In the process of insertion, the left and right engaging claws 21c of the thermistor 21A move along the inner surfaces of the left and right vertical walls 12d while being elastically deformed toward each other. After they pass the distal ends of the left and right vertical walls 12d, they spread away from each other and engage with the left and right step portions 12f (see FIG. 6), and the thermistor 21A is thereby held by the thermistor holding portion 12c such that it cannot come off.

Next, the thermistor 21B is attached to the thermistor holding portion 12c of the end electricity storage cell holder 12B. At this time, the thermistor 21B may be attached to the thermistor holding portion 12c of the adjacent intermediate electricity storage cell holder 12 by mistake. However, according to this embodiment, the harness holder 24 that has a high rigidity and that is hard to bend is attached to the harnesses 22, and therefore the thermistor 21B is automatically positioned near the thermistor holding portion 12c of the end electricity storage cell holder 12B to which the thermistor 21B is to be attached.

Thus, the thermistor 21B can be prevented from being attached to the thermistor holding portion 12c of the intermediate electricity storage cell holder 12 next to the end electricity storage cell holder 12B, and misassembly can be prevented from occurring. The reason is that in that case, the distance between the thermistors 21A and 21B is a distance corresponding to nine electricity storage cells 11, which is less than a distance corresponding to ten electricity storage cells 11, therefore the harness holder 24 bends downwardly and arcuately, and the worker easily becomes aware of misassembly.

Since the structure of the thermistor holding portion 12c of the end electricity storage cell holder 12B is the same as the structure of the thermistor holding portions 12c of the intermediate electricity storage cell holders 12, the thermistor 21B is attached to the thermistor holding portion 12c of the end electricity storage cell holder 12B in the same way.

After the pair of thermistors 21A and 21B are attached to predetermined positions in this way, the distal ends of the opposed horizontal wall portions 12e of the intermediate electricity storage cell holders 12 are engaged with the recesses 24e of the harness holder 24, and the harness holder 24 is thereby fixed to the bottom surface of the electricity storage module M. By fixing the harness holder 24 to the intermediate electricity storage cell holders 12, the harness holder 24 and the harnesses 21 can be prevented from being damaged by vibration or the like. By connecting the connector 26 provided at the distal ends of the four harnesses 21 to the electronic control unit 27, wiring can be completed.

Also when the pair of thermistors 21A and 21B are brought into contact with the electricity storage cell 11 at one end in the stacking direction and the seventh electricity storage cell 11 therefrom as shown in FIG. 12, the thermistor 21B can be reliably brought into contact with the seventh electricity storage cell 11 by bringing the thermistor 21A into contact with the electricity storage cell 11 at one end in the stacking direction, and misassembly is reliably prevented.

Since the harness holder 24 has the bottom wall 24a and the pair of side walls 24b supporting the harnesses 22 from three sides, and the plurality of claw portions 24c extending from each of the pair of side walls 24b toward each other, the harnesses 22 can be reliably held inside the harness holder 24. Since a predetermined gap is formed between the distal ends of the claw portions 24c facing each other, in case of misassembly of the thermistor 21B is, the harnesses 22 lift and protrude through the gap between the distal ends of the claw portions 24c, and the worker can be more reliably made aware of the misassembly of the thermistor 21B.

The harnesses 22 of the thermistor 21A protruding from the end of the harness holder 24 pass over the thermistor 21B so as to straddle it, and therefore the harnesses 22 curving near the thermistor 21B easily come off the harness holder 24. However, by providing the harness holder 24 with the claw portions 24c and holding the harnesses 22, the harnesses 22 can be prevented from coming off the harness holder 24.

Since the thermistor 21B is placed between the thermistor 21A and the electronic control unit 27, dew condensation water produced on the surfaces of the electricity storage cells 11 and flowing along the harnesses 22 can be prevented from reaching the electronic control unit 27 via the harnesses 22 by dropping the dew condensation water from the lowermost parts of the harnesses 22 curving downwardly so as to straddle the thermistor 21B. Since the plurality of drainage holes 24d are formed in the harness holder 24, if dew condensation water enters the inside of the harness holder 24, the dew condensation water can be discharged through the drainage holes 24d to the outside of the harness holder 24, and the deterioration of the harnesses 22 can be prevented.

For example, the thermistor 21A brings the spring members 21d into contact with the horizontal wall portions 12e of the thermistor holding portion 12c, and reaction force presses the temperature measuring portion 21e against the bottom surface 11d of the electricity storage cell 11. The thermistor holding portion 12c whose horizontal wall portions 12e are pressed downwardly by the spring force of the spring members 21d is deformed over time and moves downwardly relative to the plate portion 12a, the thermistor 21A moves downwardly away from the electricity storage cell 11, the temperature measuring portion 21e becomes less able to be in close contact with the bottom surface 11d of the electricity storage cell 11, and the temperature measurement accuracy may decrease. This problem also occurs with the thermistor 21B.

However, according to this embodiment, the thermistor holding portions 12c of the intermediate electricity storage cell holders 12 and the end electricity storage cell holders 12A and 12B are integrally connected by engaging the first engaging portions 12h with the second engaging portions 12i, and the above problem is thereby solved. The reason is that when the thermistor holding portions 12c of the intermediate electricity storage cell holders 12 and the end electricity storage cell holders 12A and 12B are integrally connected, their rigidity is increased and they are hard to deform when subjected to the spring force of the spring members 21d, and the temperature measuring portion 21e can be held in the original position and can reliably be brought into contact with the bottom surface 11d of the electricity storage cell 11.

The first engaging portions 12h are pin-shaped, the second engaging portions 12i are pinhole-shaped, and the first engaging portions 12h recess-protrusion engage with the second engaging portions 12i. By this engagement, the intermediate electricity storage cell holders 12 and the end electricity storage cell holders 12A and 12B adjacent to each other can be positioned relative to each other with a high degree of accuracy.

Figure 9:
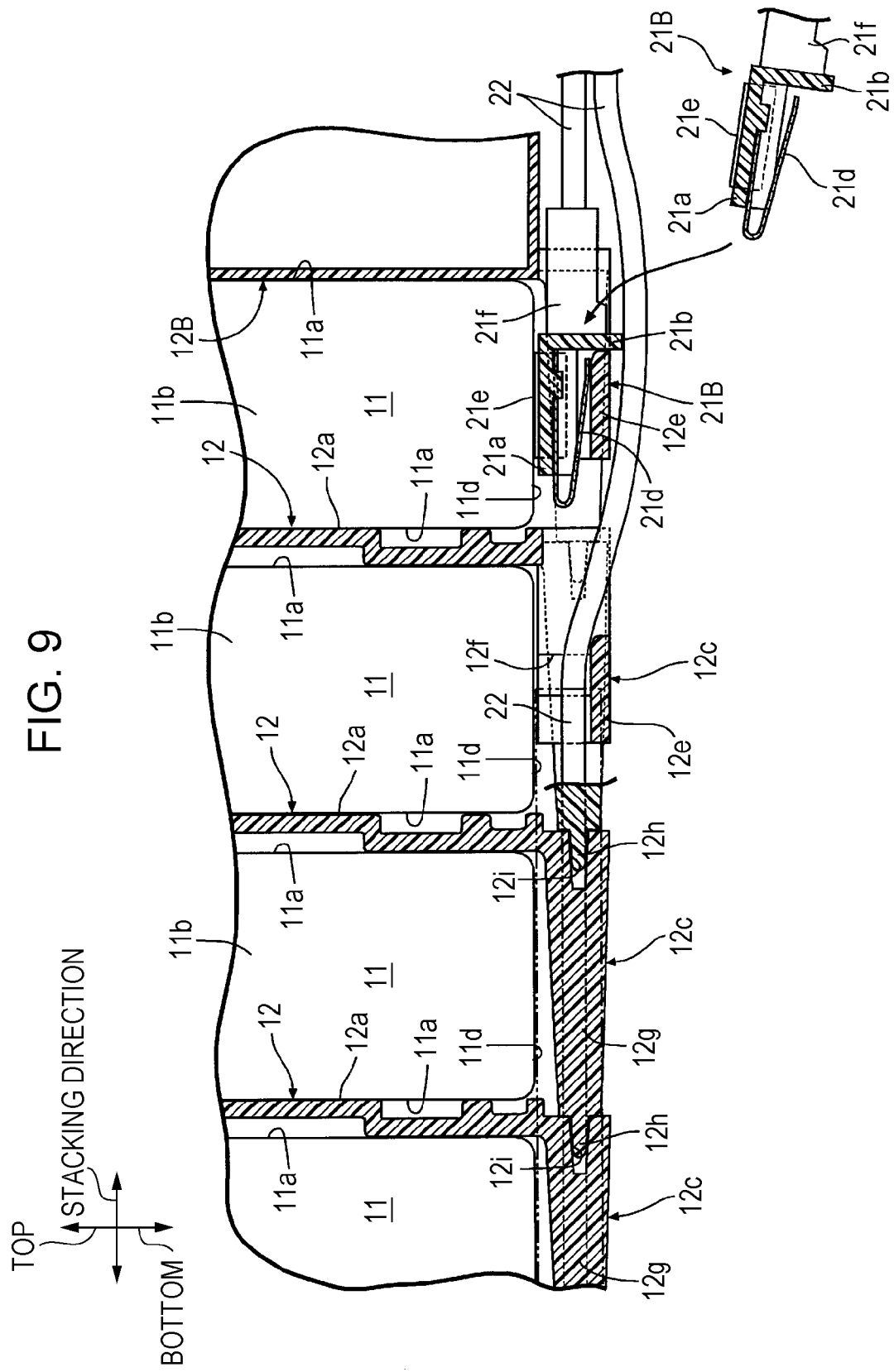
FIG. 9 is a sectional view taken along line IX-IX of FIG. 8 (first embodiment).

The first engaging portions 12h engage with the second engaging portions 12i on the downwardly extended lines of the plate portions 12a of the intermediate electricity storage cell holders 12 and the electricity storage cell holder 12A (see FIG. 5, FIG. 6, and FIG. 9). Therefore, the rigidity of the first engaging portions 12h and the second engaging portions 12i is increased by the plate portions 12a, and the temperature measuring portions 21e of the thermistors 21A and 21B can more reliably be brought into contact with the bottom surfaces 11d of the electricity storage cells 11.

If the intermediate electricity storage cell holder 12 itself or the end electricity storage cell holder 12B itself is moved downwardly by the spring force of the spring members 21d, even if the thermistor holding portions 12c are not deformed, the temperature measuring portions 21e of the thermistors 21A and 21B may become less able to be in close contact with the bottom surfaces 11d of the electricity storage cells 11. However, according to this embodiment, the third engaging portions 12b (see FIG. 2) engaging with the top surfaces 11c of the electricity storage cells 11 are provided at the upper ends of the intermediate electricity storage cell holder 12 and the end electricity storage cell holder 12B, therefore the intermediate electricity storage cell holder 12 itself or the electricity storage cell holder 12B itself can be prevented from moving downwardly, and the temperature measuring portions 21e of the thermistors 21A and 21B can more reliably be brought into contact with the bottom surfaces 11d of the electricity storage cells 11.

Second Embodiment

Figure 13:
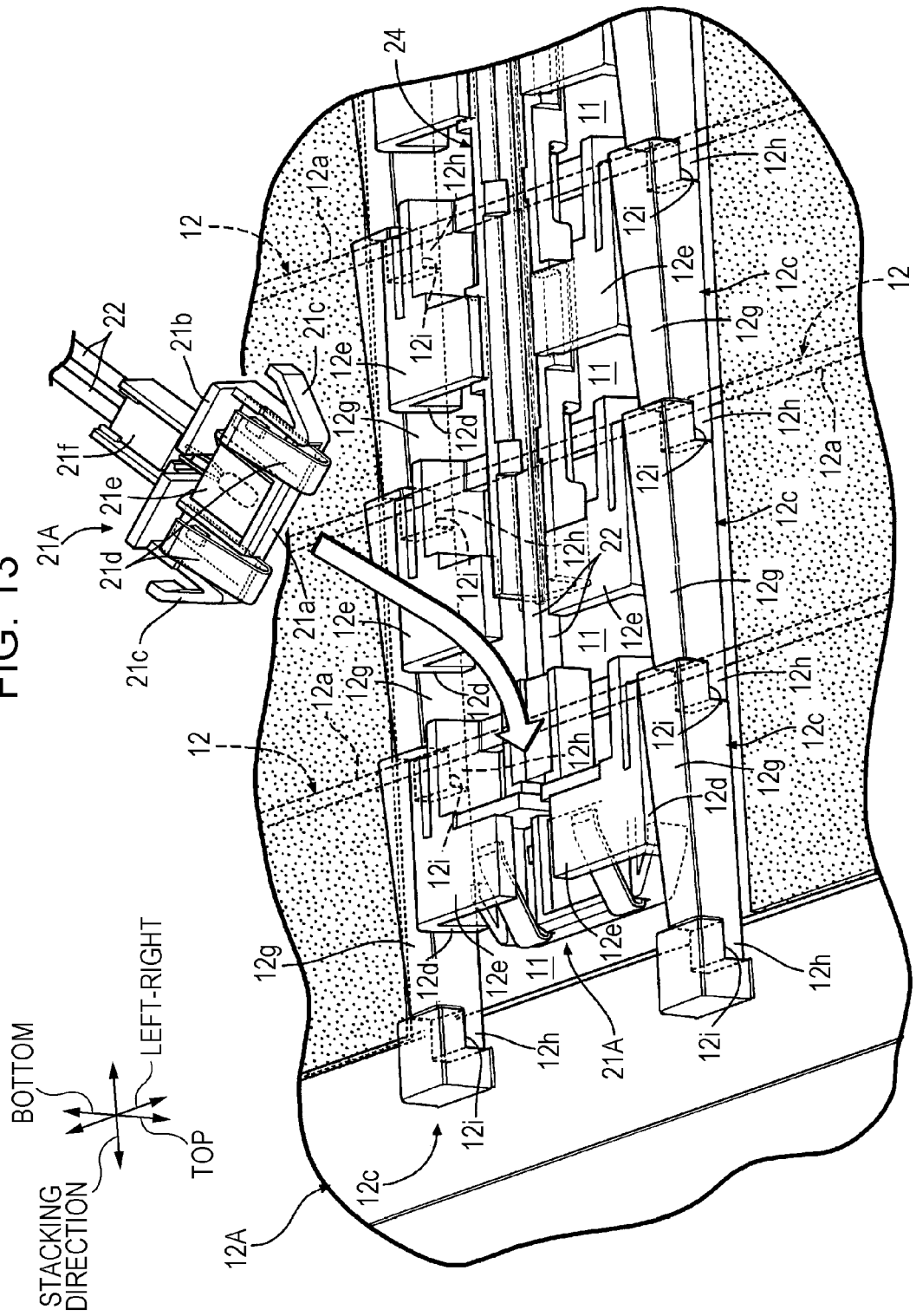
FIG. 13 is a view showing another embodiment of first and second engaging portions (second embodiment).

Next, a second embodiment of the present disclosure will be described with reference to FIG. 13.

The second embodiment is characterized by the shapes of the first engaging portions 12h and the second engaging portions 12i of the thermistor holding portions 12c. That is, in the first embodiment, the first engaging portions 12h are pin-shaped and the second engaging portions 12i are pinhole-shaped, whereas in the second embodiment, the first engaging portions 12h are protrusions and the second engaging portions 12i are recesses. That is, the first and second engaging portions 12h and 12i need only recess-protrusion engage with each other one on top of the other.

Although embodiments of the present disclosure have been described, various design changes can be made without departing from the scope of the present disclosure.

For example, the first engaging portions 12h and the second engaging portions 12i of the thermistor holding portions 12c do not necessarily have to recess-protrusion engage with each other, and may be connected to each other by engagement between flat parts.

The electricity storage cells 11 of the embodiments are not limited to lithium-ion batteries, and may be other types of batteries or capacitors.

According to a first aspect of the embodiment, an electricity storage module includes a plurality of electricity storage cells and a plurality of electricity storage cell holders stacked alternately in a stacking direction. The plurality of electricity storage cell holders are each provided with a thermistor holding portion. At least one of the thermistor holding portions supports a thermistor. The thermistor has a temperature measuring portion and a spring member. The temperature measuring portion is pressed against the electricity storage cell by the spring force of the spring member. The thermistor holding portion has a spring member contact portion with which the spring member is in contact, a first engaging portion, and a second engaging portion. The first engaging portion of one of a pair of adjacent thermistor holding portions engages with the second engaging portion of the other thermistor holding portion, and the spring member contact portion is thereby prevented from being deformed away from the electricity storage cell.

According to the first aspect, a plurality of electricity storage cells and a plurality of electricity storage cell holders are stacked alternately in a stacking direction, the plurality of electricity storage cell holders are each provided with a thermistor holding portion, and at least one of the thermistor holding portions supports a thermistor. The thermistor has a temperature measuring portion and a spring member, the temperature measuring portion is pressed against the electricity storage cell by the spring force of the spring member, and the temperature of the electricity storage cell is thereby measured. The thermistor holding portion has a spring member contact portion with which the spring member is in contact, therefore the thermistor holding portion may be deformed away from the electricity storage cell due to reaction force that the electricity storage cell exerts on the spring member, and the temperature measuring portion of the thermistor may become less able to be in close contact with the electricity storage cell. However, the thermistor holding portion has a first engaging portion and a second engaging portion, the first engaging portion of one of a pair of adjacent thermistor holding portions engages with the second engaging portion of the other thermistor holding portion, and the rigidity of the thermistor holding portion can thereby be increased. Thus, the spring member contact portion of the electricity storage cell holder is prevented from being deformed away from the electricity storage cell.

According to a second aspect of the embodiment, it is preferable that the first engaging portion and the second engaging portion recess-protrusion engage with each other.

According to the second aspect, the first engaging portion and the second engaging portion recess-protrusion engage with each other, and therefore adjacent electricity storage cell holders can be positioned relative to each other using the first engaging portion and the second engaging portion.

According to a third aspect of the embodiment, it is preferable that the first engaging portion be pin-shaped, and the second engaging portion be pinhole-shaped.

According to the third aspect, the first engaging portion is pin-shaped, the second engaging portions is pinhole-shaped, and therefore adjacent electricity storage cell holders can be positioned relative to each other using the first engaging portion and the second engaging portion with a high degree of accuracy.

According to a fourth aspect of the embodiment, it is preferable that the electricity storage cell holders each have a plate portion in contact with a major surface of the electricity storage cell, the thermistor holding portion be connected to the lower end of the plate portion, and the first engaging portion and the second engaging portion engage with each other on the downwardly extended line of the plate portion.

According to the fourth aspect, the thermistor holding portion of the electricity storage cell holder is connected to the lower end of the plate portion, the first engaging portion and the second engaging portion engage with each other on the downwardly extended line of the plate portion, therefore the rigidity of the first and the second engaging portions is increased by the plate portion, and the temperature measuring portion of the thermistor can more reliably be brought into contact with the bottom surface of the electricity storage cell.

According to a fifth aspect of the embodiment, it is preferable that a third engaging portion engaging with the top surface of the electricity storage cell be provided at the upper end of the plate portion of the electricity storage cell holder.

According to the fifth aspect, a third engaging portion engaging with the top surface of the electricity storage cell is provided at the upper end of the plate portion of the electricity storage cell holder. Therefore, the thermistor holding portion can be prevented from moving downwardly due to the spring force of the spring member of the thermistor, by engaging the third engaging portion at the upper end of the plate portion of the electricity storage cell holder with the top surface of the electricity storage cell, and the temperature measuring portion of the thermistor can more reliably be brought into contact with the bottom surface of the electricity storage cell.

Obviously, numerous modifications and variations of the present invention are possible in light of the above teachings. It is therefore to be understood that within the scope of the appended claims, the invention may be practiced otherwise than as specifically described herein.

What is claimed is:

1. An electricity storage module comprising:
a plurality of electricity storage cells; and
a plurality of electricity storage cell holders, the plurality of electricity storage cells and the plurality of electricity storage cell holders being stacked alternately in a stacking direction, each of the plurality of electricity storage cell holders including a thermistor holding portion, at least one of the thermistor holding portions of the plurality of electricity storage cell holders being provided to support a thermistor, the thermistor having a temperature measuring portion and a spring member, the thermistor holding portion comprising:
a spring member contact portion configured to contact the spring member and configured to be pressed by the spring member in a direction away from one of the electricity storage cells, the temperature measuring portion configured to press against one of the electricity storage cells by a spring force of the spring member when the spring member is in contact with the spring member contact portion;
a shaft portion connected to the spring member contact portion and extending in the stacking direction;
a first engaging portion provided on one end side of the shaft portion in the stacking direction; and
a second engaging portion provided on another end side of the shaft portion in the stacking direction,
wherein the first engaging portion of one of the electricity storage cell holders directly engages with the second engaging portion of another of the electricity storage cell holders to prevent the spring member contact portion from being deformed away from one of the electricity storage cells, and
wherein the first engaging portion and the second engaging portion are disposed on electricity storage cell holders that are adjacent to each other in the stacking direction.

2. The electricity storage module according to claim 1, wherein the first engaging portion and the second engaging portion engage with each other with a concavity and a convexity.

3. An electricity storage module comprising:
a plurality of electricity storage cells; and
a plurality of electricity storage cell holders, the plurality of electricity storage cells and the plurality of electricity storage cell holders being stacked alternately in a stacking direction, each of the plurality of electricity storage cell holders including a thermistor holding portion, at least one of the thermistor holding portions of the plurality of electricity storage cell holders being provided to support a thermistor, the thermistor having a temperature measuring portion and a spring member, the thermistor holding portion comprising:
a spring member contact portion configured to contact the spring member and configured to be pressed by the spring member in a direction away from one of the electricity storage cells, the temperature measuring portion configured to press against one of the electricity storage cells by a spring force of the spring member when the spring member is in contact with the spring member contact portion;
a shaft portion connected to the spring member contact portion and extending in the stacking direction;
a first engaging portion provided on one end side of the shaft portion in the stacking direction;
and a second engaging portion provided on another end side of the shaft portion in the stacking direction,
wherein the first engaging portion of one of the electricity storage cell holders engages with the second engaging portion of another of the electricity storage cell holders to prevent the spring member contact portion from being deformed away from one of the electricity storage cells,
wherein the first engaging portion and the second engaging portion are disposed on electricity storage cell holders that are adjacent to each other in the stacking direction,
wherein the first engaging portion and the second engaging portion engage with each other with a concavity and a convexity, and wherein the first engaging portion is pin-shaped, and the second engaging portion is pinhole-shaped.

4. The electricity storage module according to claim 1, wherein the electricity storage cell holders each have a plate portion in contact with a major surface of the electricity storage cell,
wherein the thermistor holding portion is connected to a lower end of the plate portion, and
wherein the first engaging portion and the second engaging portion engage with each other on a downwardly extended line of the plate portion.

5. The electricity storage module according to claim 4, wherein the electricity storage cell holders each have a third engaging portion engaging with a top surface of the electricity storage cell, the third engaging portion being provided at an upper end of the plate portion of the electricity storage cell holder.

6. The electricity storage module according to claim 1, wherein each of the electricity storage cell holders includes a plate portion provided between adjacent electricity storage cells in the stacking direction.

7. The electricity storage module according to claim 1, wherein the first engaging portion is a protrusion, and the second engaging portion is a recess.

8. The electricity storage module according to claim 1, wherein the shaft portion forms a longitudinal axis that extends along the stacking direction.

* * * * *